(12) United States Patent
Digangi

(10) Patent No.: US 6,491,996 B2
(45) Date of Patent: Dec. 10, 2002

(54) SANITARY COVER FOR SHOPPING CARTS AND THE LIKE

(76) Inventor: Mary Ann Digangi, 8623 S. Willow Dr., Tempe, AZ (US) 85284

(*) Notice: Subject to any disclaimer, the term of this patent is extended or adjusted under 35 U.S.C. 154(b) by 7 days.

(21) Appl. No.: 09/834,235

(22) Filed: Apr. 12, 2001

(65) Prior Publication Data

US 2002/0150714 A1 Oct. 17, 2002

(51) Int. Cl.$^7$ ................................................. B32B 3/06
(52) U.S. Cl. .................. 428/43; 428/99; 428/100; 297/229; 297/256.17; 150/154
(58) Field of Search .................. 428/43, 99, 100, 428/40.1; 297/229, 256.17, 228.13, 219.1; 280/33.992; 150/154, 158, 165

(56) References Cited

U.S. PATENT DOCUMENTS 5,678,888 A * 10/1997 Sewell et al. .......... 297/256.17

* cited by examiner

Primary Examiner—Alexander S. Thomas
(74) Attorney, Agent, or Firm—Gregory J. Nelson

(57) ABSTRACT

A protective, sanitary cover for use on a shopping cart, infant seat and similar child seating devices. The cover is a strong, absorbent material having tabs which carry fasteners to secure the cover in place. Perforated areas are provided which can be removed or punched out to allow the child's legs to extend through the cover and through the openings, such as the leg receiving openings in a shopping cart seat.

8 Claims, 3 Drawing Sheets

SANITARY COVER FOR SHOPPING CARTS AND THE LIKE

FIELD OF THE INVENTION

The present invention relates to a protective sanitary cover and more particularly relates to a protective cover to shield children from germs and dirt that may be found on shopping carts, high chairs, infant seats, and similar publicly used seating devices. The cover the present invention also provides insulation and comfort to a child or infant within a shopping cart or infant seat.

BACKGROUND OF THE INVENTION

Parents and custodians often place infants and small children in seating devices and conveyances such as shopping carts, infant seats, and strollers. Placing infants or young children in the child seats of public shopping carts presents the problems of sanitation and comfort. Since shopping carts and infant seats are available at such locations such as supermarkets, shopping malls and the like, these items are used by the public. Generally, these devices are not washed or disinfected between uses. Because of the repeated use of these devices by the public, these devices present problems of sanitation. Germs left as a result of the repeated use can easily be passed to the child occupant as a result of the child coming in contact with the shopping cart, car seat, public high chair, publicly used strollers.

Parents and custodians have become aware of this problem and employ a number of approaches to minimize the spread of germs to an infant or child using an infant seat, shopping cart seat, public high chair, the like. Some parents simply attempt to disinfect the device by use of disinfectant sprays or products such as disinfectant wipes which may be carried in a purse or pocket and unpackaged and used to wipe the surfaces. The difficulty with this approach is that it is virtually impossible for the parent or guardian to reach all of the surfaces particularly in an object such as a shopping cart.

Various prior art patents show covers for the protection of small children. U.S. Pat. No. 4,805,937 discloses a handle cover for a shopping cart which is formed from a padded fabric strip. Velcro fasteners are provided for securing the strip around the handle of a conventional shopping cart. The cover provides protection against germs, dirt and disease to small children riding in the shopping cart seat. A seat cover for providing added protection and comfort to the child riding in shopping cart seat includes strap fasteners for attachment to the handle cover. The seat cover and handle cover may be folded to compact sizes for convenient storage and transportation.

U.S. Pat. No. 4,883,701 shows a disposable infant seat liner with shoulder straps receiving slotways and leg or crotch strap receiving slotways designed to fit infant seat liners having various strap placements. Infant seat handle or strap receiving slotways may also be included and may be of an arcuate shape for receiving infant carrier handles or waist straps. The strap receiving slotways may be selectively open by a user and may also be perforated to facilitate to selective opening.

U.S. Pat. No. 5,810,437 shows a portable, collapsible child safety seat for use within a shopping cart. The portable, collapsible child safety seat comprises a seat support frame securable to an interior rear wall of the shopping cart wherein the seat support frame comprises the first L-shape member and a second L-shaped member. The portable, collapsible child safety seat further comprises a collapsible seating member for suspending a child within the shopping cart.

A liner for a shopping cart child seat is shown in U.S. Pat. No. 5,330,250. The apparatus supports a seated infant in a shopping cart. Side members comfortably support the infant in an upright position while allowing the infant to move his head and arms freely. The backrest is padded and made of flexible material that conforms to an infants posture when seated. The base is padded and has an extension providing additional comfort to the infants legs when seated. An attachment strap holds the liner into the child's seat while a restraining strap holds the child within the liner. The upper portion of the backrest folds down for easy storage and transportation of the liner when not in use. The liner is specifically configured to work cooperatively with the wire basket construction shopping cart having protruding wires which provide discomfort to a child sitting within the child seat without a liner.

U.S. Pat. No. 5,678,888 shows a shopping cart child seat cover made from pliable material having a seat section, a back section, a front section and two side sections. The seat section is sized and shaped to fit on the top of a seat bottom of a child seat portion of a shopping cart. Cover fasteners are positioned on portions of the back section of the child seat cover at which a portion of the back section that is positioned against a back wall the child seat engages a container side portion of the back section and hangs down over the top of the back wall of the child seat. In like manner, cover fasteners are provided on portions of the front and side sections of the seat cover. The pliable material is designed to be washable, soft and cushiony. Optional features may include a safety belt, bottle holder, toy holder and cushions.

All of the various prior devices and approaches to the problem of infant sanitation and comfort may provide partial solutions to the problem, but have certain deficiencies. Some covers and liners are not disposable and therefore are bulky and must be carried with the parent and installed in the cart or other device at the time of use and require laundering between uses. Several covers are found on the market may be folded to a compact size for storage and unfolded at the time of use. However, these covers are sometimes difficult to attach and do not accommodate shopping carts, infant seats and infant carriers of different sizes. Accordingly, there exists a need for a sanitary cover which is convenient and compact and which can easily be carried by the child or custodian and deployed and easily installed at time of use. Further there exists a need for a cover which may be a single-use device which is disposable or which may be reused at the election of the parent or custodian.

BRIEF SUMMARY OF THE INVENTION

In view of the deficiencies of the prior art as set forth above, the present invention provides an improved sanitary cover for one or more children in shopping carts, high chairs, infant seat strollers and similar conveyance and child seating devices. The present invention is a sanitary seat cover that protects children from dirt, debris, contaminants common to most public infant devices such as shopping carts, high chairs and the like. The cover is configured to fit seats of various sizes and will protect up to two toddlers, as for example, two toddlers as seated in the seat of a larger size shopping cart. The material is a strong, cross-fiber sheeting similar to that used for such applications as sanitary dentist office bibs. Preferably the material is coated on one side with impervious coating to repel moisture. The soft fiber side of the material presents a comfortable surface for the infant while the non-porous side creates a barrier to moisture and other elements that may exist on the seat's surface.

The cover is reusable and, for example, could be used by a parent or guardian several times during a shopping excursion. The seat attaches to the cart by fasteners that may be loop and hook-type fasteners such as the type sold under the Trademark Velcro® may be adhesive tabs which may be easily deployed at the time of use. Preferably the material is a biodegradable material which will degrade safely and naturally once disposal has occurred. The cover is of a size so that is large enough to cover all the surfaces which the child or infant may encounter while using the cover and the cover is dimensioned to extend over the handle front, rear and opposite sides of the seat area of a shopping cart. Perforated areas are provided which can be removed as required by the parent or guardian to allow the child's legs to extend through the cover and through the openings such as the leg receiving openings in a shopping cart frame.

While the present invention in intended primarily for use in connection with shopping carts, product is also suitable for other applications which a parent may require a sanitary shield including car seats, public high chairs, strollers and the like. The above other objects and advantages will be more fully understood and appreciated from the following description, claims and drawings in which:

DETAILED DESCRIPTION OF THE DRAWING

Figure 2:
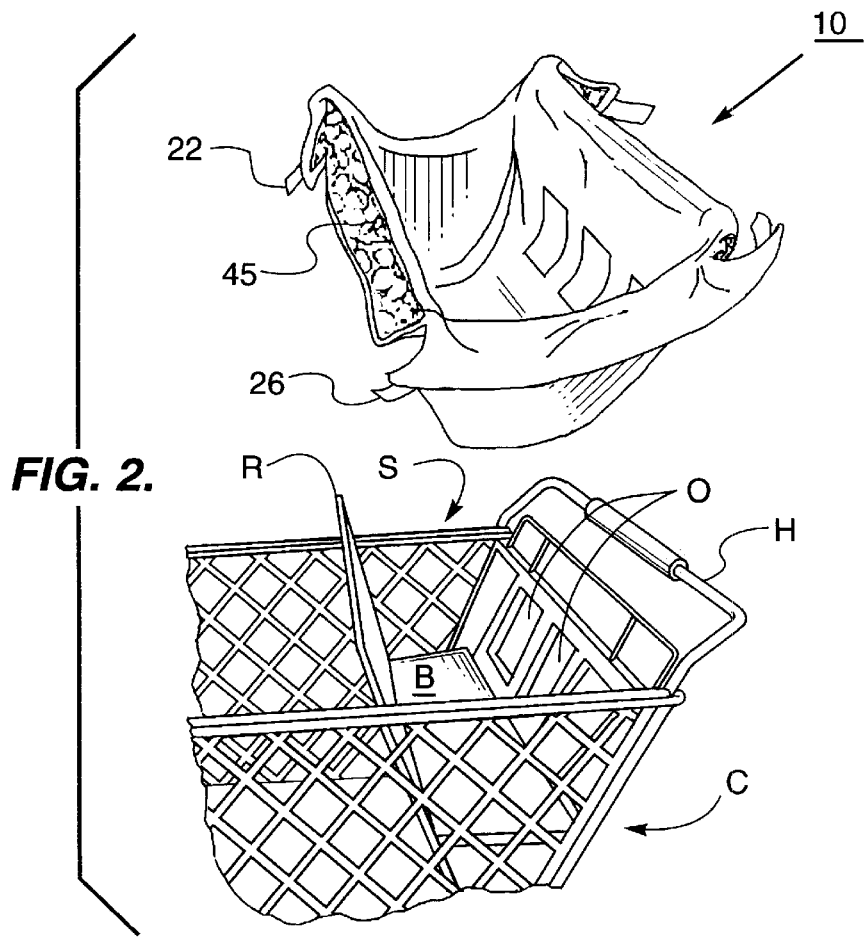
FIG. 2 is a perspective view showing protective cover of the present invention in a deployed condition, ready to be installed in the child seat area of a shopping cart.
Figure 3:
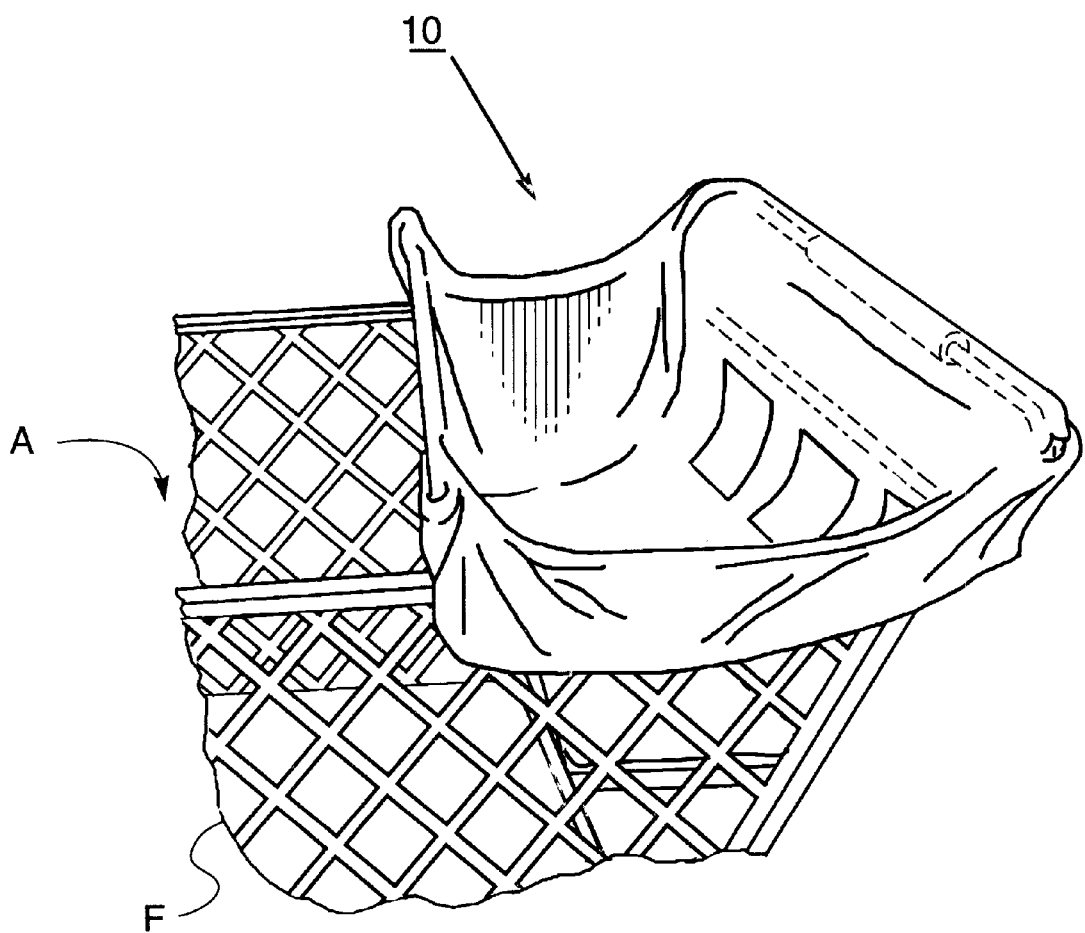
FIG. 3 is a detail view showing the protective cover in the child seat area of a representative device, in this case a shopping cart.
Figure 4:
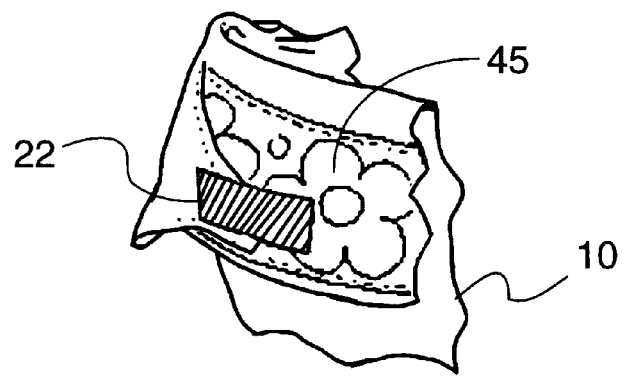
FIG. 4 is a detail view of a corner of the shield showing the cooperating fastener elements.

Turning now to the drawings, the protective cover shield of the present invention is generally designated by the number 10. The cover is adapted for installation in various infant and child seating devices which in FIGS. 2 to 3 are represented by a shopping cart (C). The shopping cart (C) is of conventional construction and is commonly found in supermarkets, malls, discount stores and the like. The cart seat has a frame (F) consisting of steel rods or a plastic grid which define a load receiving area (A). A handle (H) is disposed on one end of the cart and the cart is supported for mobility on casters or rollers not shown. Adjacent to the handle is child seat area (S) having bottom (B) and a backrest (R). The area of the cart frame below the handle generally has two or more openings (O) so that the child may be seated against the back rest (R) with the child's legs extending through the openings (O). In larger carts, there may be as many as four openings (O) so that several children or infants may be accommodated in the seat area (S). Some shopping carts are designed to permit the back rest (R) to be folded in a collapsed condition. However, regardless of the particular shape or configuration of the cart or the infant or child receptacle, the cover 10 of the present invention may be conveniently and easily adapted for use therewith.

Figure 1:
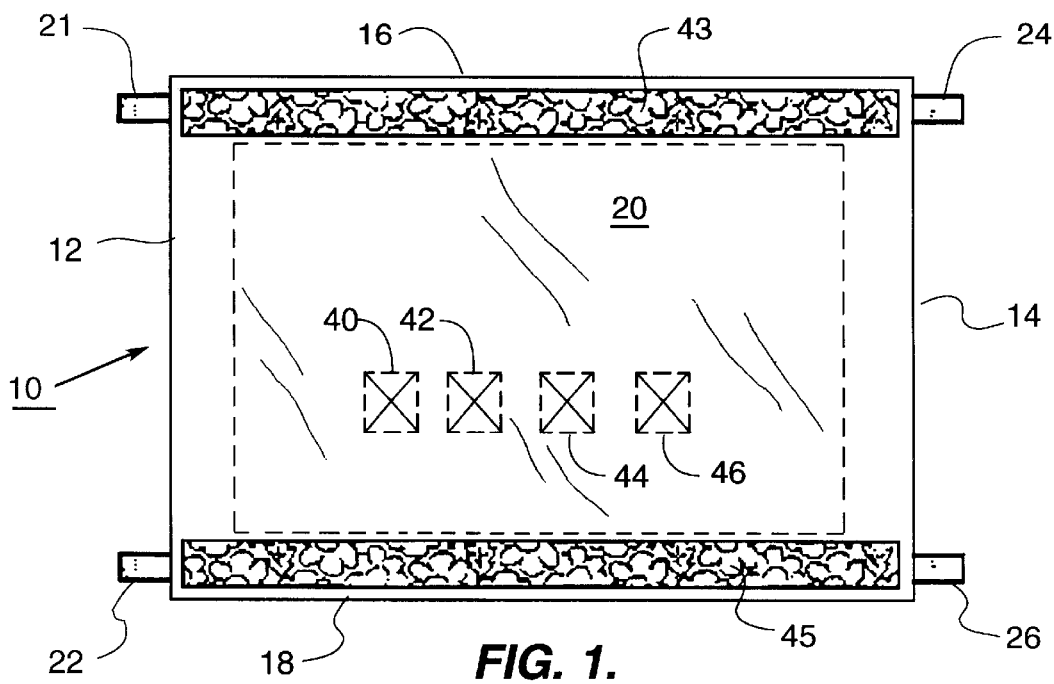
FIG. 1 is a plan view of the protective cover of the present invention.
Figure 5:
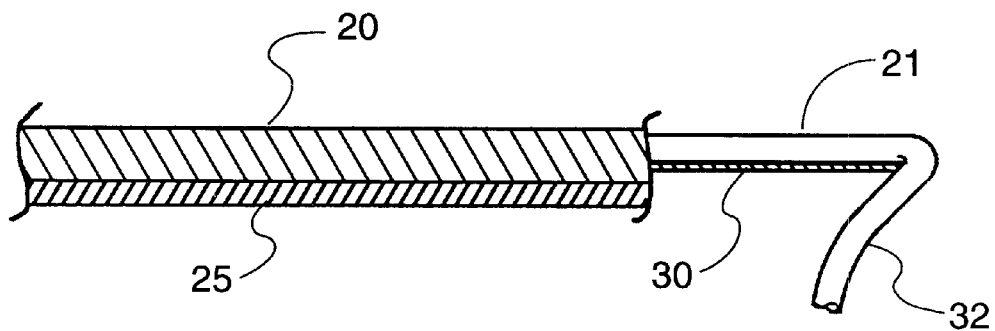
FIG. 5 is a cross-sectional view of the material of the cover.

The cover 10 as seen in FIG. 1 is shown as being generally rectangular having opposite sides 12 and 14 and opposite edges 16 and 18. It is preferred that the cover be generally rectangular but may also be other geometric shapes such as square or even oval. In the case of a rectangular configuration, it is preferred that the length dimension (L) be approximately 36" to 48" and the overall width approximately 28" to 40" to accommodate use and installation with most types and sizes of child carriers or seating devices. The cover has a top side or surface 20 and a bottom surface 25. Preferably the material is a multi-ply material as shown in FIG. 5.

The top or upwardly disposed surface 20 is an absorbent soft material such as cotton material and may be quilted for further comfort of the child. Materials such as those commonly used in disposable diapers, and other disposable products such as bibs, coverings or gowns used in medical or dental offices work well. The padded surface 20 offers comfort to the child and will insulate the child from hot or cold in the event the cart has been stored outside as is common practice with supermarkets and stores.

The bottom or downwardly disposed surface 25 preferably is moisture impervious. The moisture impervious surface will serve to protect the child preventing migration of moisture that may be on the seating surface. The moisture impervious surface may be a separate ply or film which is bonded to the inner surface such as vinyl or polyethylene or may be applied by a coating technique. The upper and lower surfaces are bonded on formed as an integral panel. Various layered biodegradable materials which have a soft surface and a moisture impervious barrier are known, as for example polymers and co-polymers of polyesters or cellulose as known to those in the art particularly in the field of diapers.

Borders 43, 45 are provided extending longitudinally adjacent the opposite edge is 16 and 18. The borders may be aesthetically pleasing and include some decorative indicia or graphics as shown. The functional purpose of the borders is to provide a surface for attachments of the tabs 21, 22, 24 and 26 to securely cover in place. The borders may extend entirely the length of the cover along edge 16 and 18 or may extend only in the area adjacent the opposite sides 12 and 14. The borders may be one component of a loop and hook material such as that sold under the trademark Velcro or simply may be a textured surface as, for example, a surface that has been quilted or roughened so as to be securable to a component of loop and hook fastener system.

The tabs 21, 22, 24 and 26 extend longitudinally from adjacent to corners of the cover as seen in FIGS. 1 and 5. The tabs have a fastening material 30 on the downwardly disposed surface as seen in FIG. 5. The fastening material 30 may be an adhesive or may be a component of a loop and hook fastener. In the case of the adhesive, the adhesive surface is protected by a removable cover 32. The removable cover 32 may be formed as shown in FIG. 5 and simply peeled back out of the way or may be entirely removed to expose the fastener surface 30 at the time of use. It is preferred that the cover not be separatable to minimize litter.

The cover 10 may be provided to the user individually and as indicated as above, and may be a single-use disposable item or may be used several times at the election of the user. The cover 10 can be folded into a compact position and individually packaged for easy carrying in a purse, pocket or diaper bag or may be provided in a multi-pack from which they may be dispensed one at a time. If the parent or guardian wishes to use the cover, as for example, when shopping at a discount store, the cover is removed from its package and opened and deployed to the position shown in FIG. 1 to form an enclosure or envelope. The overall size of the cover enables it to be used with child seats and carriers of different sizes. The user will unfold and shape the cover 10 to the position shown in FIG. 2 placing it within the seat area (S) of the cart. The opposite sides 12, 14 and edges 16, 18 are folded over the frame, backrest (R) and panel (P) of the shopping cart. This fully protects the child in the event the child places his or her hands on the edge of the cart and since the edges of the cover extend downwardly to protect the child even if the child reaches over the edges of the cart frame. The cover may be easily secured and placed by removing or peeling back the protective cover 32 on the individual tabs and for example, attaching the attachment surface 30 of tab 20 to adjacent portion of cooperative fastening component on the border 16. The procedure is repeated at all four corners. The soft surface 20 is disposed upwardly to provide insulation from heat, protection from germs and a comfortable surface for the child. The bottom surface protects against migration of moisture that may be on the surface.

Figure 6:
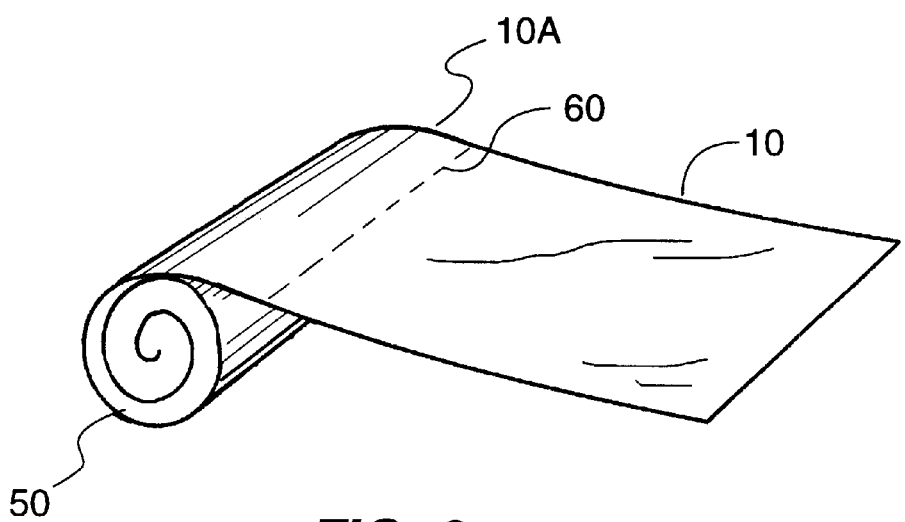
FIG. 6 shows a plurality of separable covers in roll form.

Stores and retail centers may make the covers available as a public service located near shopping carts. In this case, as seen in FIG. 6, the covers may be provided on a roll 50 to be dispensed in tear-off fashion with adjoining covers 10, 10A, etc. connected at severable perforated area 60.

It will be noted that the cover includes perforated sections 40, 42 and 44 each being generally square or rectangular in shape. The perforated areas are longitudinally disposed and positioned closer to one edge, in this instance edge 18, so that when the cover is in position in the shopping cart, the perforated openings are generally aligned or register with the openings (O) in the cart. The attendant can by manual force remove or punch out two or more of the perforated sections. This will allow the child's legs to extend through the openings in the cart. The larger style shopping cart as commonly used in discount warehouse stores generally accommodate more than one child. Thus, if more than one child is to be placed within the seat area of the shopping cart, all four of the perforated panel areas would be removed. In the event only a single child is to be placed in the car seat, normally the intermediate panels 42 and 44 would be removed.

According to the present invention provides a sanitary infant toddler seat liner or cover that protects children from dirt and debris and extreme hot or cold contaminants or germs that are found in most public child carriers such as shopping carts and child seats as well as high chairs. The cover is designed to fit seats of various sizes and is configured so that it may protect several toddlers in the seats designed to accommodate two toddlers.

The material is a strong cross-fiber sheeting and is coated on one side with non-porous or impervious coating. The upwardly disposed side is soft and provides a comfortable surface to infants and toddlers and the non-porous surface style is a protective shield from moisture and other elements that may be on the seating surface.

As pointed out above, the product is designed to be reusable and may be reused for example during a day when the parent or guarding shops at several store locations. The attachment system enables the cover to be temporarily secured in the seat in a manner so that a protective envelope is established around the child or infant. Once use has been completed, the item may be disposable. Preferably the liner attachment material are materials that are biodegradable.

The product would be available through such conventional outlets as supermarkets, drugstores and children's stores. While the cover may be packaged individually it may also be provided in boxes containing multiple units or may be provided a roll so that it can be dispensed in a pull-out and tear-out fashion.

It will be obvious to those skilled in the art to make various changes, alterations and modifications to the invention described herein. To the extent such changes, alterations and modifications do not depart from the spirit and scope of the appended claims. They are intended to be encompassed therein.

I claim:

1. A child protective cover comprising:
   a) an upper layer of soft absorbent material;
   b) a lower layer of generally moisture impervious materials said upper and lower layer forming a panel having opposite sides and edges;
   c) a border area extending at least part way along the upper surface adjacent said sides and edges;
   d) fastener tabs extending from the sides and having a fastening surface engageable with said border to form a partial enclosure in which a child may be placed; and
   e) at least one removable section in said panel for receipt of the legs of a child.

2. The cover of claim 1 wherein said cover is biodegradable.

3. The cover of claim 1 wherein said cover is generally rectangular and dimensioned to cover the seat area of a shopping cart.

4. The cover of claim 1 wherein said fastening surface is one component of a loop and hook fastener system.

5. The cover of claim 1 wherein said fastening surface is covered by a removable liner.

6. The cover of claim 1 wherein said border includes decorative indicia.

7. The cover of claim 1 wherein a plurality of removable sections are provided.

8. The cover of claim 1 wherein a plurality of covers are provided on a roll and are separable from one another.

* * * * *